(12) United States Patent
Rizzi et al.

(10) Patent No.: US 7,636,711 B2
(45) Date of Patent: Dec. 22, 2009

(54) EXTENSIBLE WORKFLOWS (75) Inventors: Lorenzo Rizzi, Kirkland, WA (US);
Brijesh D Bhatia, Redmond, WA (US);
Ferit Findik, Sammamish, WA (US);
Marc D Reyhner, Redmond, WA (US);
Vitaly Voloshin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 11/168,843

(22) Filed: Jun. 28, 2005

(65) Prior Publication Data
US 2006/0294072 A1   Dec. 28, 2006

(51) Int. Cl.
*G06F 17/30* (2006.01)
(52) U.S. Cl. .............................. 707/3; 707/100; 717/151
(58) Field of Classification Search .................. 707/3, 707/100; 717/151
See application file for complete search history.

(56) References Cited

U.S. PATENT DOCUMENTS

| | | | |
|---|---|---|---|
| 5,619,656 A | 4/1997 | Graf | |
| 5,867,495 A * | 2/1999 | Elliott et al. ................. | 370/352 |
| 6,587,878 B1 | 7/2003 | Merriam | |
| 6,901,442 B1 | 5/2005 | Schwaller et al. | |
| 7,062,537 B2 * | 6/2006 | Aziz et al. .................... | 709/206 |
| 7,065,566 B2 | 6/2006 | Menard et al. | |
| 7,197,559 B2 | 3/2007 | Goldstein et al. | |
| 7,499,994 B2 | 3/2009 | Sapiro et al. | |
| 2002/0184363 A1 | 12/2002 | Viavant et al. | |
| 2002/0198891 A1 * | 12/2002 | Li et al. ....................... | 707/102 |
| 2003/0018627 A1 * | 1/2003 | Turner et al. .................... | 707/3 |
| 2004/0015583 A1 * | 1/2004 | Barrett et al. ................. | 709/224 |
| 2004/0148299 A1 * | 7/2004 | Teegan et al. ................. | 707/100 |
| 2005/0114448 A1 * | 5/2005 | Skomra ........................ | 709/204 |
| 2005/0198298 A1 | 9/2005 | Nishikawa et al. | |
| 2006/0004749 A1 * | 1/2006 | Dettinger et al. ................ | 707/6 |
| 2006/0111921 A1 * | 5/2006 | Chang et al. .................... | 705/1 |
| 2006/0167891 A1 | 7/2006 | Blaisdell et al. | |
| 2006/0245369 A1 | 11/2006 | Schimmelpfeng et al. | |
| 2007/0022093 A1 * | 1/2007 | Wyatt et al. .................... | 707/2 |

* cited by examiner

*Primary Examiner*—Hosain T Alam
*Assistant Examiner*—Jieying Tang
(74) *Attorney, Agent, or Firm*—Lee & Hayes, PLLC (57) ABSTRACT

Computing devices receive data type specific data from various local and external sources and managed entities. The data is received and process using modules and monitors, where the modules are sequenced to process the data and the monitors are used to provide condition states of the individual data sources and/or an overall condition state of a grouping of the data sources.

14 Claims, 7 Drawing Sheets

EXTENSIBLE WORKFLOWS

BACKGROUND

A management system typically includes a management server and multiple computers or computing devices. Computing devices may also be known as client computers or clients. The management server can receive performance information from the clients. Examples of performance data include utilization as to resources resident at a client, such as a client processor, client memory, client disk storage, etc. Furthermore, performance information is also provided as to certain services, such as network interconnections between the client and management server.

Each client can implement a management agent to gather and process data received from various sources and particularly sources local to the client. The processed data is provided as performance information to the management server An example of a local source is an instrumentation module run by a client operating system. Data from sources are sent to the management agent for processing.

When data is received by the management agent, the data is analyzed or filtered as to a particular data type. Filtered data is sent to a sequence of processes defined as a workflow. Each particular data type is processed using a specific workflow. In other words, a workflow is specific to a particular data type. Processed data may be reanalyzed or filtered again, and reprocessed using either the same workflow or a different workflow.

In many instances, it is desirable to support new data types to allow different tasks to be performed. For example, it may be desirable to monitor a new or different source that provides a different data type. A management agent is limited to a number of data types based on the number of workflows available at the management agent. In order to support new or different data types, new or different workflows are needed. Because workflows can include complex processes strung together, it can be a significant modification to a management agent when new or different workflows are added. In other words, workflows are not necessarily extensible to support different data types. Furthermore, since existing workflows can include complex strings of processes, it can be a significant undertaking to change, modify, and/or maintain the existing workflows.

SUMMARY

A computing device processes data of various data types from different data sources, and processes the data based on a particular action using one or more modules that perform particular processes. The modules are grouped in a particular sequence to support the action.

In other certain implementations, monitors may receive the data and provide condition states for each of the data sources, as well as an overall condition state for a grouping of the data sources.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques in which extensible modules and monitors are included in computing devices to support various data types to be processed at a computing device.

Figure 1:
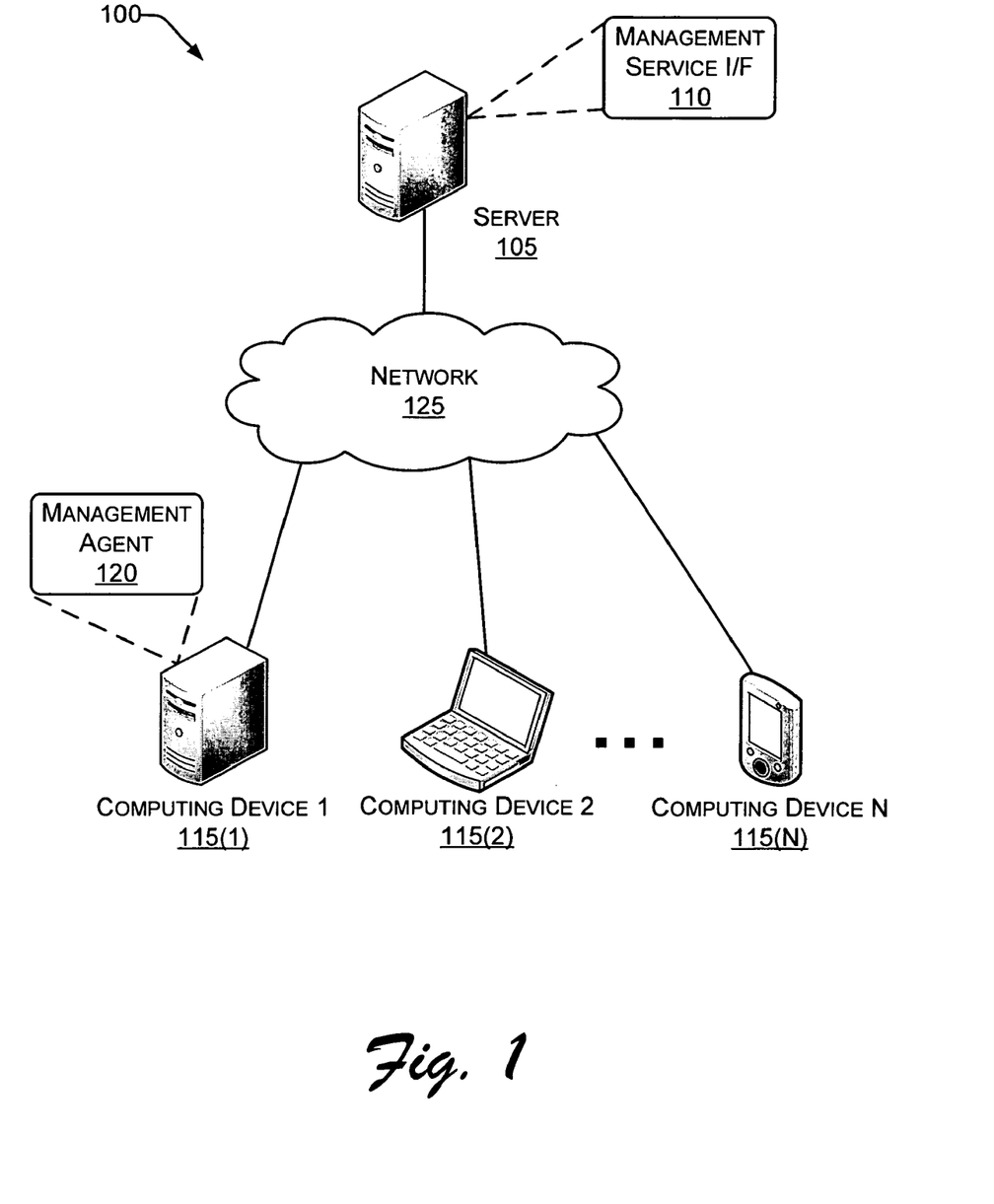
FIG. 1 is an illustration of a management system that includes computing devices implementing management agents having extensible modules and monitors for workflows.

FIG. 1 shows a management system 100 that includes computing devices that implement management agents. The management agents include extensible modules and monitors that support various data types. In particular, the modules and monitors support workflows that process data and provide condition state derived from the data. As will be further discussed below, modules and monitors may be added or changed to support new and different data types, and providing extensible workflows.

A management server 105 may provide a service (e.g., applications, data, etc.) through a management service interface 110 to computing devices 115(1)-115(N). In this example, computing device 1 115(1) is shown as a desktop personal computer (PC). Computing device 2 115(2) is shown as a laptop PC. Computing device 3 115(N) is shown as a personal digital assistant (PDA). It is contemplated that in other cases, management system 100 includes other computing devices such as smart phones, media players, dedicated server computers, and the like.

In certain instances, it is desirable for management server 105 to monitor the performance of computing devices 115(1)-115(N). As represented by computing device 115(1), each of the computing devices 115(1)-115(N), includes a management agent 120. Management agent 120 includes modules, rules, and monitors that receive particular data types and process the data types using particular workflows. Management agent 120 may be provided and/or updated by management server 105. Modules, rules, and monitors may be added to management agent 120, lending great extensibility in processing new or different data types. In specific, new or different workflows may be created to process data and new monitors may be added to monitor data sources.

A network 125 connects management server 105 with computing devices 115(1)-115(N). In particular, the network 125 allows management server 105 to access and receive performance information derived at computing devices 115(1)-115(N). The performance information is derived from data processed by management agents (e.g., management agent 120) at computing devices 115(1)-115(N), where the management agents include extensible modules and monitors that support various data types.

Although the example of management system 100 describes performance information processed at computing devices 115(1)-115(N) and sent to management server 105, it is contemplated that for certain cases, computing devices 115(1)-115(N) process performance information without sending it to management server 105.

Figure 2:
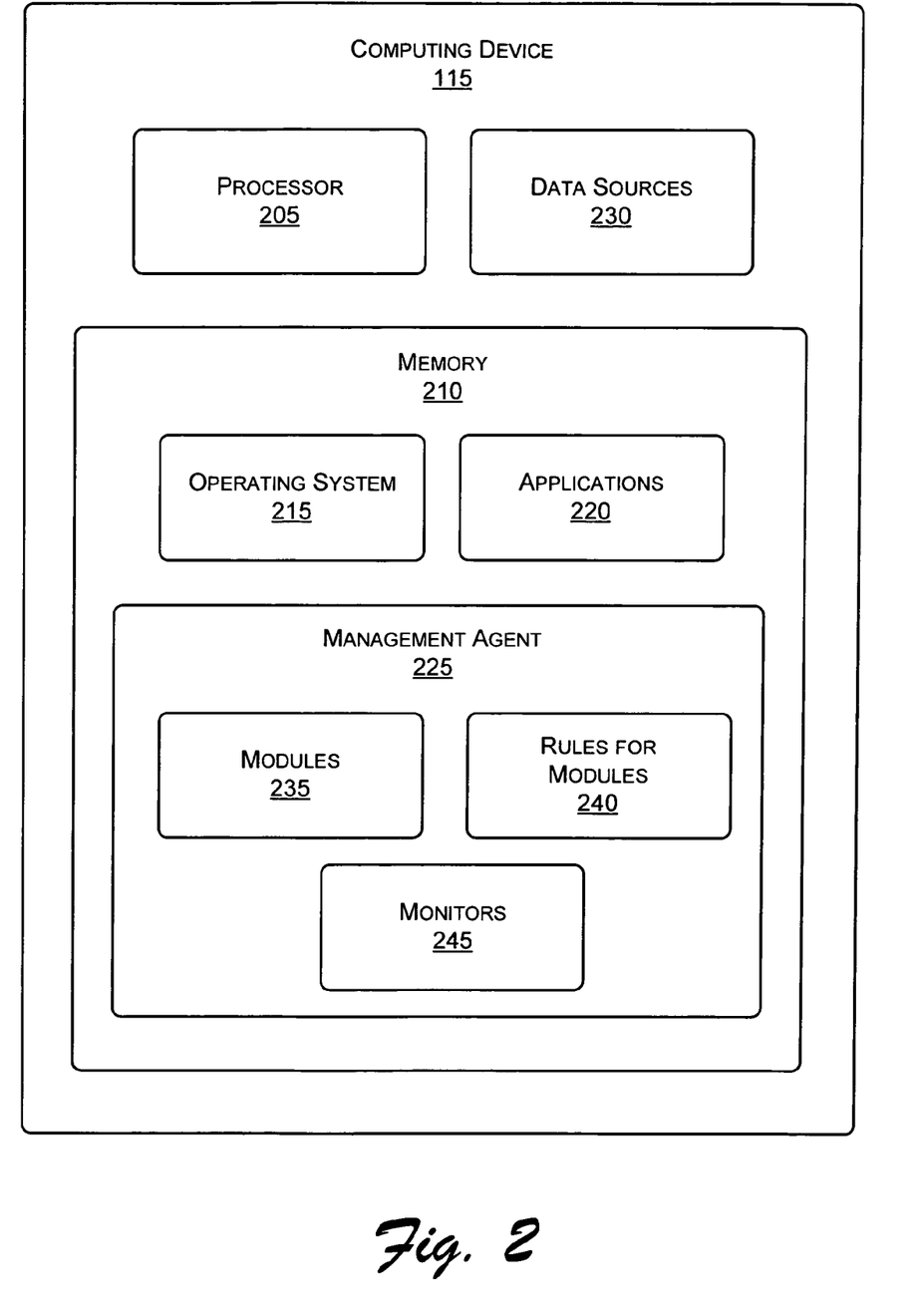
FIG. 2 is a block diagram of a computing device that implements a management agent that has extensible modules and monitors for workflows.

FIG. 2 shows an exemplary computing device 115 that implements a management agent. The management agent includes extensible modules and monitors that support various data types. Rules define how modules are sequenced to support workflows. Monitors define groups of modules that perform condition state monitoring of data sources.

Computing device 115 includes computing devices 115(1)-115(N) of FIG. 1. Computer device 115 includes a central processing unit, controller, or processor 205. Processor 205 is particularly configured to access and control a memory 210. The memory 210 includes various volatile and non-volatile memories, and includes read only memory (ROM) and random access memory (RAM). Memory 210 stores an operating system 215 and applications 220. Applications 220 include one or more application programs that are run by operating system 215.

Memory 210 further includes a management agent 225. Management agent 225 is configured to receive data from various data sources and/or managed entities as represented by data sources 230. Examples of data from data sources 230 include network connection information (e.g. simple network management protocol or SNMP data), processor and memory resource information, text logs, event logs, etc. Examples of managed entities include services such as network services. Such data may be gathered locally such as processor and memory resource information, or received from another source such as network connection information.

Data from data sources 230 are defined by particular data types. Each data type is processed by a specific workflow. As discussed above, a workflow is a sequence of processes. Particular processes are defined by specific modules in extensible modules 235. Rules define how modules are sequenced in order to support a particular workflow. Rules also define how modules may be grouped to provide composite modules. Specific rules are included in rules modules library 240. Modules may be modified or new modules added in modules 235 to support new and/or different data types as needed. Furthermore, rules in rules modules library 240 may be modified and/or added to support new and/or different workflows.

Monitors 245 determine health or condition state of particular data sources of data sources 230. Monitors define specific groups of modules in modules 235, and how the group of modules performs particular health or condition state monitoring. As an example, monitoring may be performed by monitors 245 as to health or condition states of local resources such as processor utilization, memory capacity, local network throughput, etc. Monitors in monitors 245 are data type specific. In other words, monitors support specific data types. Monitors also include composite monitors as further discussed below.

Figure 3A:
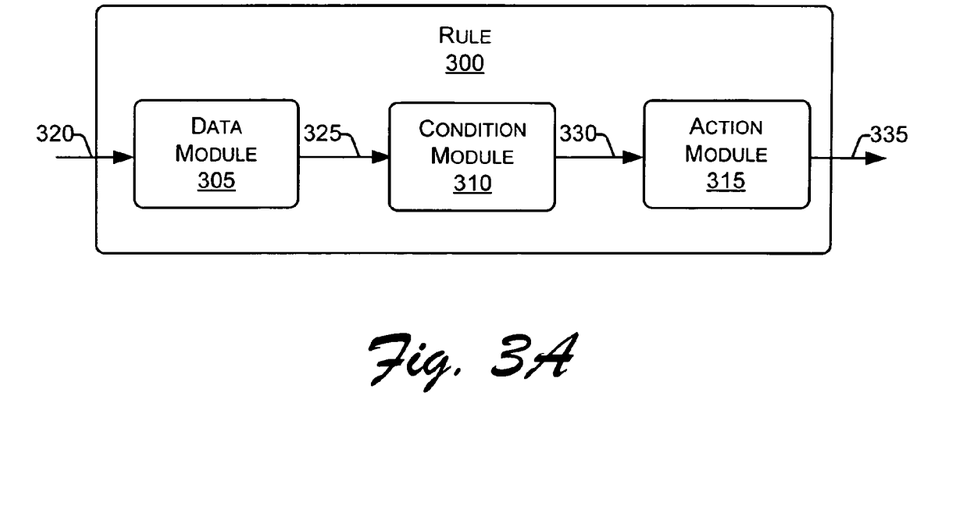
FIG. 3A is a block diagram of a rule that defines a workflow made up of extensible modules.

FIG. 3A shows a rule 300 that defines a sequence of modules. Rule 300 may be included in rules for monitors library 240 of FIG. 2. Rule 300 is defined by three particular modules. Such modules may be referred to as "extensible modules", because modules may be modified or added as necessary to support specific workflows. Modules may be grouped into particular classes: a data module class, a condition module class, and an action module class. In this example, rule 300 is made up of modules represented by each class: a data module 305, a condition module 310, and an action module 315. Each class of module performs a specific function. In certain cases, regardless of class, a module may be a pass through module that merely receives and passes on data.

Data module 305 is representative of data source modules that receive data from a single data stream. In this example, the data is represented by data stream 320 which may be an asynchronous data stream from a particular data source (e.g., a data source in data sources 230). Data module 305 is data type specific. Data module 305 receives data, formats the data as data type specific data, and inserts the data into a single data stream 325 that other modules can consume.

Condition module 310 is representative of condition detection modules that receive an input stream and determine whether a pattern has occurred. The pattern is representative of a predefined condition. In this example, the input stream is data stream 320. Although one input stream is shown in this example, condition module 310 can receive more than one input stream from more than one module. Furthermore, if multiple input streams are supported, each of the data in the input streams may be a different data type. Condition module 310 outputs a single data stream 330 that other modules can consume.

Action module 315 is representative of action modules. Action modules receive input streams and perform a particular action on data of the input streams. A single output stream is provided. The data in the output stream may be used by other modules, or may be consumed by other components or processes. For example, the data in the output stream may be further processed by the management agent 120, or the data may be sent to operating system 215 and/or applications 220 described above.

For instances where a single input stream is received, a particular action may or may not transform the received data of the input stream. For example, if action module 315 performs a ping action, the ping action merely queries data in the input stream 330, and passes the data along as an output stream 335 (i.e., the data in output stream 335 is the same as the data in input stream 330). If a write action is performed by action module 315, the write action changes the data in input stream 330 and outputs different data in the output stream 335.

A combination or sequence of modules as defined by a particular rule, such as rule 300, defines a specific workflow. Therefore, to support new or different workflows, new rules are written that either use existing modules (e.g., modules in modules 235) and/or new modules are created. By breaking down workflows into three classes of modules (i.e., data, condition, and action), extensibility is provided to create or provide for new workflows by creating and/or providing new modules and defining a rule that sequences the modules to support new workflows. As a minimum, a workflow may be supported by one data module and one action module.

Figure 3B:
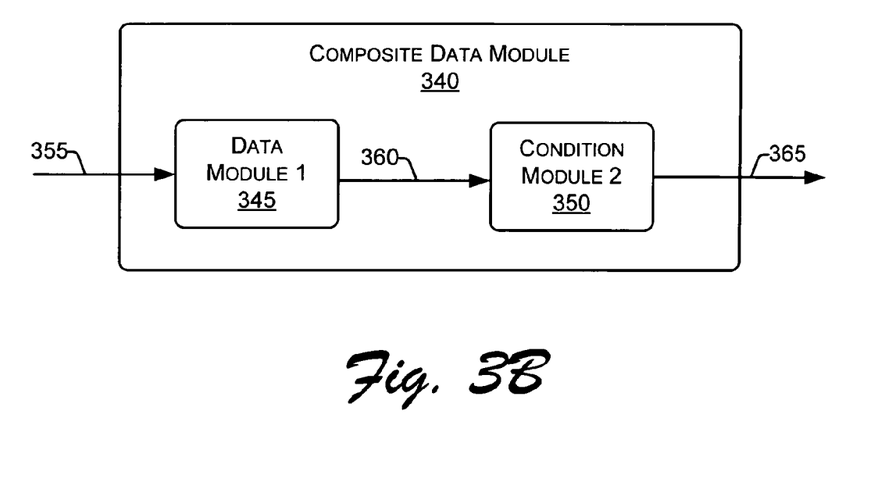
FIG. 3B is a block diagram of a composite module comprised of extensible modules.

FIG. 3B shows an exemplary composite data module 340. Composite data module 340 is representative of composite modules that are made up of individual modules. In other words, individual modules may be grouped together and treated as a single composite module. Furthermore, composite modules may be grouped to form other composite modules. Similar classes of modules may be grouped (e.g. condition modules with condition modules) or dissimilar classes of modules may be grouped (e.g., data modules with action modules) to form a single composite module. The composite module is treated as a particular class of module, depending on process(es) or function that the composite module performs and its input stream(s) and output stream.

In this example, composite data module 340 includes a data module 1 345 and a condition module 2 350 grouped together and treated as a single data module. Composite data module 340 receives an input stream 355 which is processed by data module 1 345. The data module 1 345 provides an output data stream 360 which is the input data stream of condition module 2 350. Condition module 2 350 provides an output stream 365. Although made up of distinct modules (i.e., data module 345 and condition module 350), composite data module 340 is treated as a single data module. Composite data module is treated as receiving a distinct data input stream 355 and providing a distinct data output stream 365.

As discussed above, rules define which modules are grouped and how the modules are grouped to support particular workflows. Furthermore, rules also may define how modules are grouped as composite modules. Rules may be written in or described by one of various languages such as extensible markup language (XML). The rules may be included in rules for modules library 240 of FIG. 2.

In certain cases, along with processing data from data sources, it is desirable to monitor the health or condition state of the data sources or managed entities. Examples of data sources (managed entities) include local computing/processor resources, memory resources, network connections, and services. A monitor is a specific group of modules that receive data from the data source(s), process the data, and provide condition state describing the health of the data source(s). Such monitors may be included in monitors 245 described in FIG. 2

The condition state of a monitor may represent the availability of a data source or managed entity. At any particular time, a monitor is in one condition state, meaning that condition states are mutually exclusive of one another. Each monitor condition state may be mapped to one of a number of health or condition states. For example, health or condition states include three values: green, yellow, and red. Green indicates a "go" or fully operative health or condition state, yellow indicates a cautionary condition state, and red indicates a "stop" or non-operative condition state.

A leaf monitor is defined as a monitor that may receive data and provides condition state. A rollup monitor is defined as a monitor that receives condition state from other monitors and provides a condition state. A hybrid monitor is defined as a monitor that receives both data and condition states, and provides a condition state. Furthermore, monitors may be combined together to form composite monitors. Examples follow that illustrate such monitors.

Figure 4A:
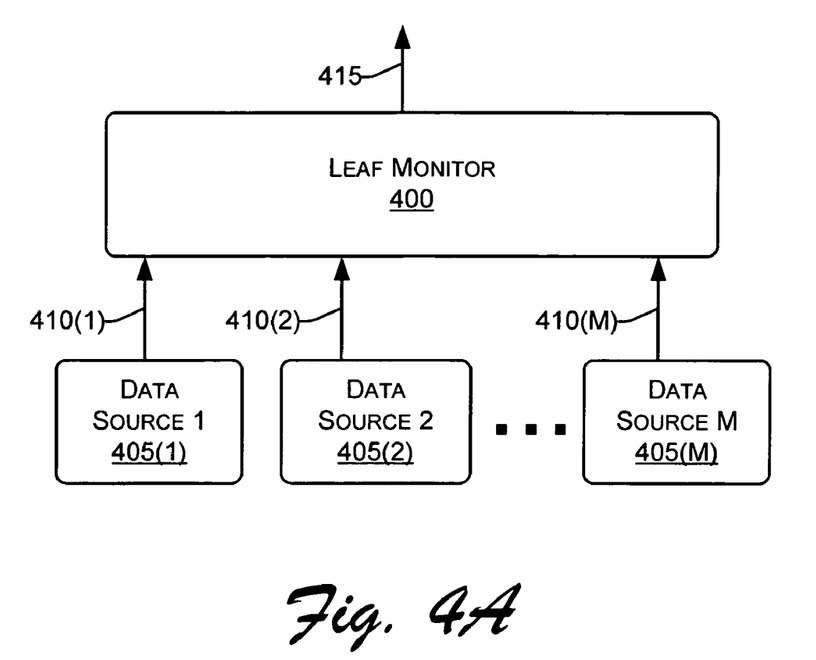
FIG. 4A is a block diagram of a leaf monitor that provides data source condition state information.

FIG. 4A shows an exemplary leaf monitor 400. Leaf monitor 400 supports one or more managed entities or data sources (e.g., data sources 230). Data sources 405(1)-405(M) represent such data sources (managed entities). Data sources 405(1)-405(M) provide respective input data streams 410(1)-410(M). Data in data streams 410(1)-410(M) are defined as particular data types. The output from leaf monitor 400 is a condition state 415, where condition state 415 may be one of three health or condition states: green, yellow, or red as defined above.

Figure 4B:
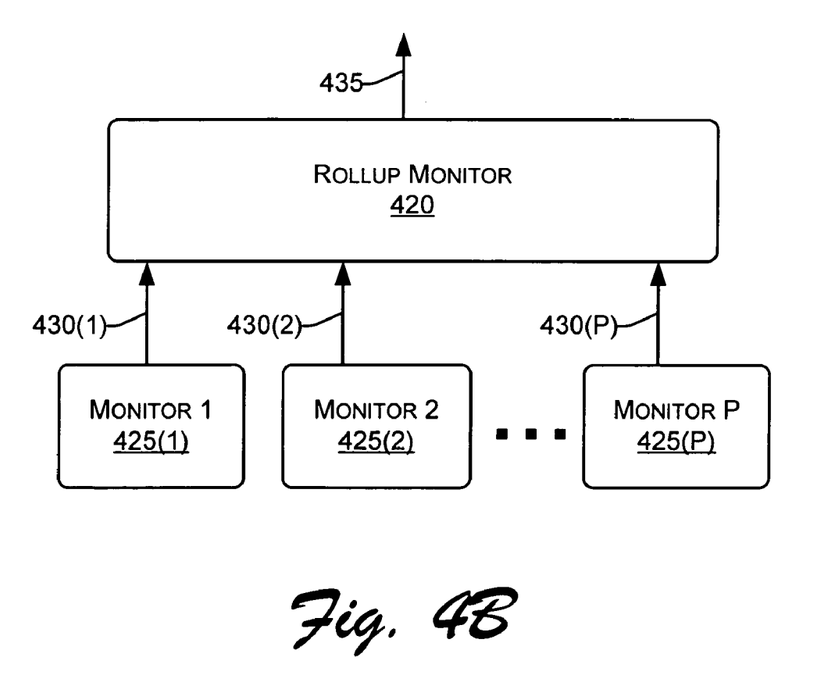
FIG. 4B is a block diagram of a rollup monitor that provides condition state of other monitors.

FIG. 4B shows a rollup monitor 420. Rollup monitor 420 supports one or more monitors, such as leaf monitor 400. Monitors 425(1)-425(P) represent such monitors. The monitors 425(1)-425(P) may be grouped to represent a particular set of data resources, such as local resources (processor and memory) directed to the operational status of a computing device. Furthermore, the group of monitors 425(1)-425(P) may represent a particular service. Therefore, rollup monitor 420 may describe the condition state of a computing device, or a service provided by or to the computing device as defined by the group of monitors.

Monitors 425(1)-425(P) provide respective data streams 430(1)-430(P). Data in data streams 430(1)-430(P) provide specific conditions states of green, yellow or red. The output from rollup monitor 420 is a condition state 435 representative of the overall health of the group of monitors 425(1)-425(P). For example, if each of the monitors 425(1)-425(P) has a condition state of green, then the overall condition state 435 is green. If any of the monitors 425(1)-425(P) has a condition state of red, the overall condition state 435 is red.

Figure 4C:
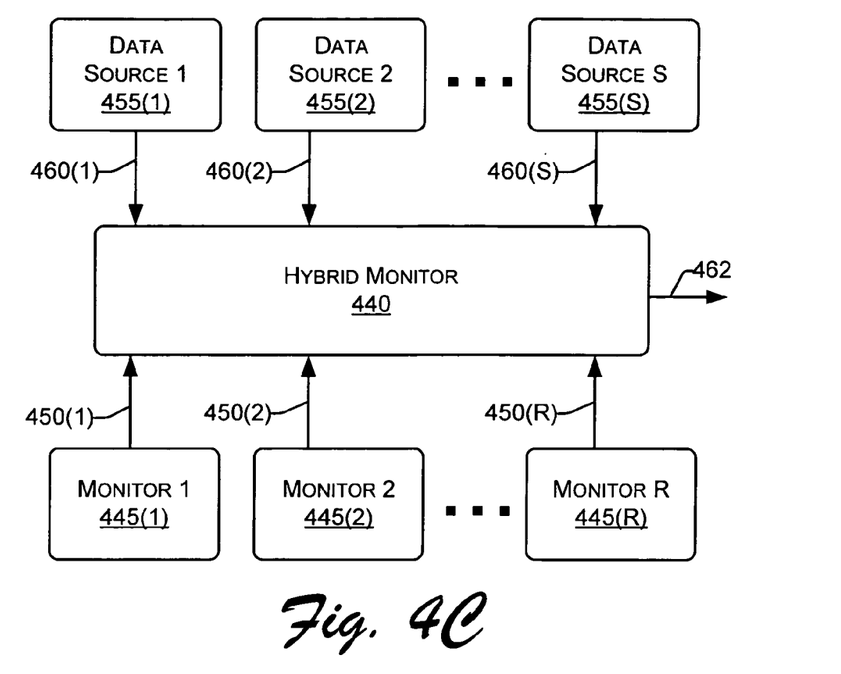
FIG. 4C is a block diagram of a hybrid monitor that provides condition state of data sources and other monitors.

FIG. 4C shows a hybrid monitor 440. Hybrid monitor 440 supports one or more monitors, such as leaf monitor 400, and one or more managed entities or data sources (e.g., data sources 230). Monitors 445(1)-445(R) represent such monitors. Monitors 445(1)-445(R) provide condition state data or information in the respective data streams 450(1)-450(R). Data sources 455(1)-455(S) represent data sources (managed entities) that provide respective data streams 460(1)-460(S), which provide data to be processed at hybrid monitor 440. In particular, hybrid monitor 440 translates the data into condition states as performed by a leaf monitor (e.g., leaf monitor 400). The output from hybrid monitor 440 is a condition state 462 describing an overall condition of monitors 445(1)-445(R) and data sources 455(1)-455(S).

Figure 4D:
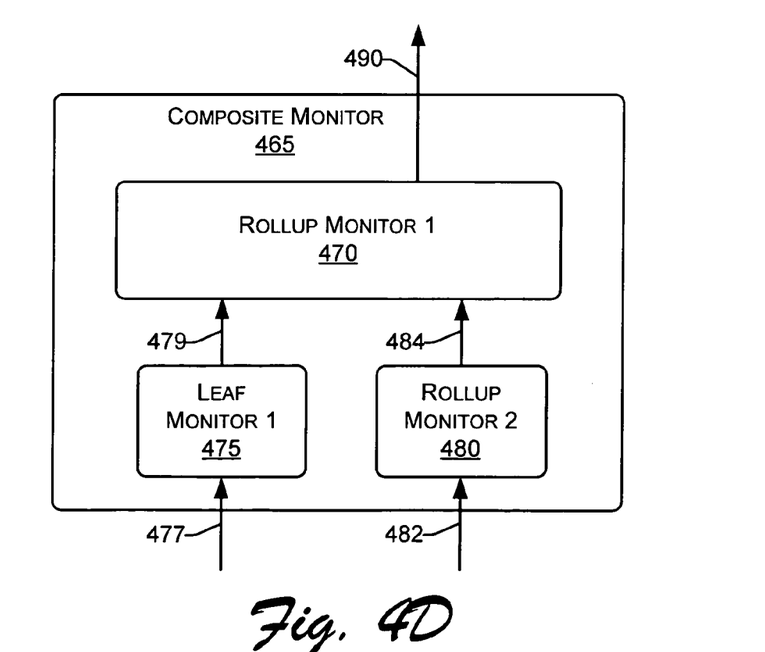
FIG. 4D is a block diagram of a composite monitor comprised of other monitors.

FIG. 4D shows a composite monitor 465. Composite monitor 465 is representative of composite monitors that are made up of similar and/or dissimilar monitors (i.e., leaf and/or rollup monitors) where a composite monitor is treated as a single monitor. Composite monitors may be defined as a leaf monitor, a rollup monitor, or a hybrid monitor. In this example, composite monitor 465 is defined as a hybrid monitor, and includes or is made up of a rollup monitor 1 470, leaf monitor 1 475, and a rollup monitor 2 480.

Leaf monitor 1 475 receives one or more input streams containing data as represented by data stream 477, and provides a condition state output 479 to rollup monitor 1 470. Rollup monitor 2 480 receives one or more input streams containing condition states as represented by condition state stream 482, and provides a condition state output 484 to rollup monitor 1 470. Rollup monitor 1 470 outputs a condition state 490. Although made up of different monitors, composite monitor 465 is treated as a single monitor that receives input streams 477 and 482, and outputs a condition state 490.

As discussed above, rules define which modules are grouped and how the modules are grouped to support particular workflows. Furthermore, rules also may define how modules are grouped into composite modules. Rules may be written in or described by one of various languages such as XML. The rules may be included in rules for modules library 240 of FIG. 2.

Figure 5:
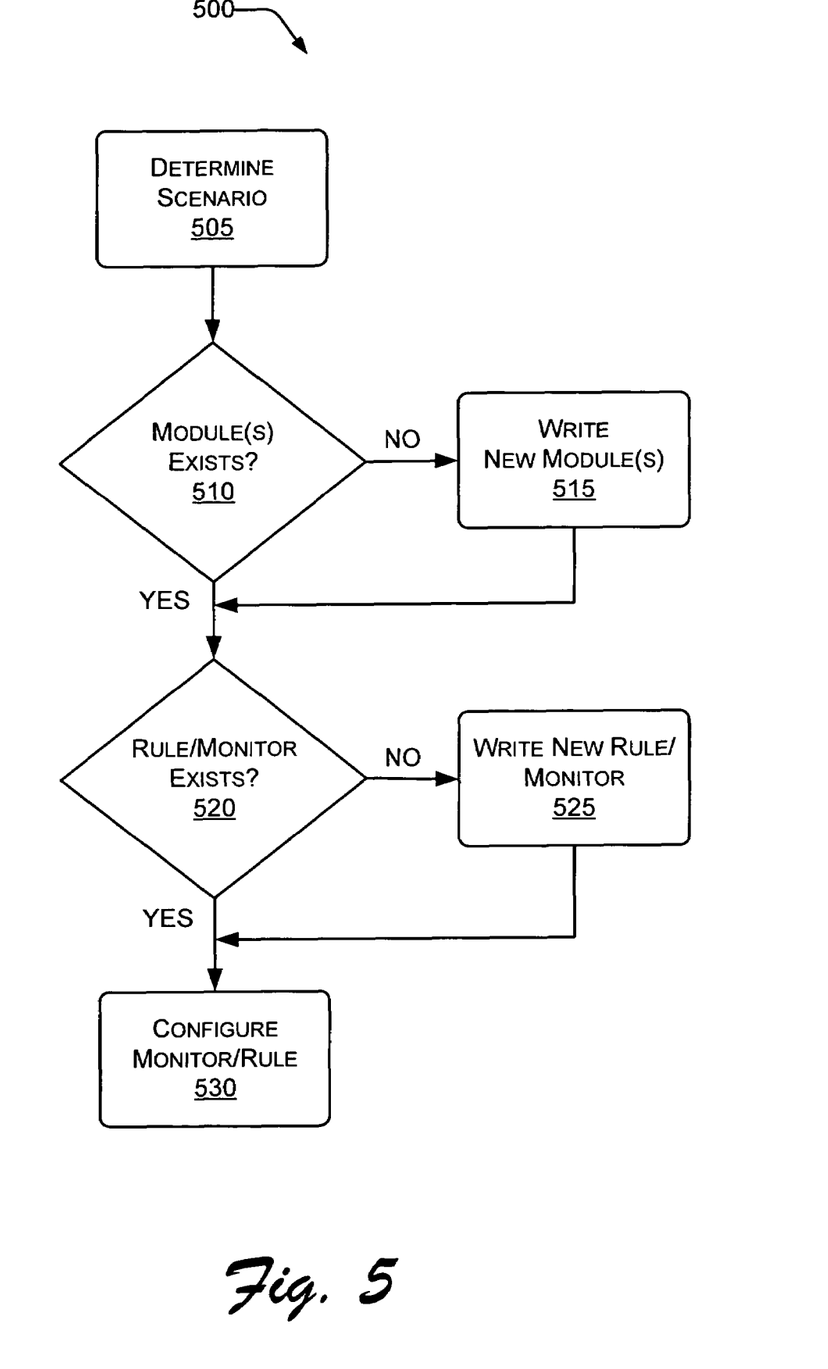
FIG. 5-6 is a flow diagram illustrating a process for creating new modules to address a given scenario.

FIG. 5 shows a process 500 that creates modules to address a particular scenario. The scenario may be a workflow that receives and processes data or condition state monitoring of data sources and/or managed resources as discussed above. The process 500 represents creation or authoring of modules that may be included and extend modules 235, rules for modules 240, and monitors 245 described above. Particular reference is made to computing device 115. The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 500 is described with reference to computing device 115 described above. Although described as a flowchart, it is contemplated that certain processes may take place concurrently or in a different order.

At block 505, a determination is made as to a particular scenario. The scenario may be receiving and processing particular data types from specific data sources descriptive of a particular workflow that includes particular processes. In other cases, the scenario may be monitoring a condition state or condition states of data sources or managed entities. In specific, a monitor is used to perform such monitoring. The data is of a particular data type and is received from a data source such as data sources in data sources 230 of FIG. 2.

Rules and/or monitors define particular modules that support the particular scenario, and how such modules are grouped or sequenced. If a module(s) does not exist that supports the rule or monitor, such as in modules 235 (i.e., following the NO branch of block 510), at block 515, a new module is created or written. The new module or modules are placed in modules 235 for use by the particular scenario and other scenarios. Modules may include data modules, condition modules, and action modules as discussed above. In particular, when condition state monitoring is performed, a monitor is created with a data module and a condition module.

If a module(s) exists (i.e., following the YES branch of block 510), a rule or monitor may or may not exist to perform the particular scenario. If a rule does not exist in a library, such as rules for rules for modules 240 or in monitors 245, (i.e., following the NO branch of block 520), at block 525, a new rule is created or written. A new rule may be written and placed in rules for modules, and a new monitor may be written and placed in monitors 245.

If a rule or monitor exists in a library (i.e., following the YES branch of block 510), then at block 530, the rule or monitored is configured and operate on computing device 115. When configured and operating, the particular scenario may be supported.

Figure 6:
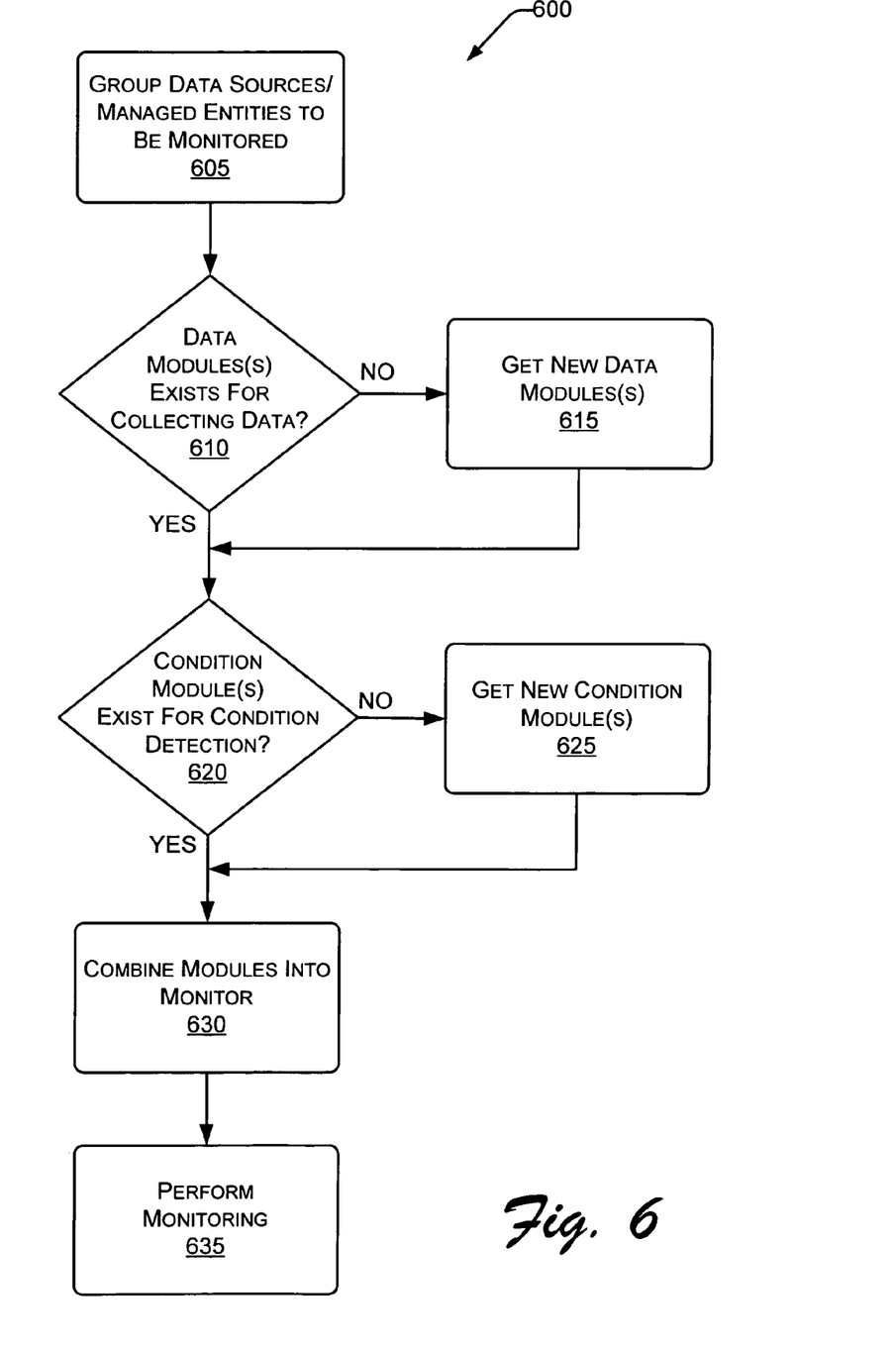

FIG. 6 shows a process 600 that performs monitoring 635. The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain processes may take place concurrently or in a different order.

FIG. 6 first shows a group of data sources/managed entities to be monitored at block 605. Second, at block 610, it is asked if a data module(s) exists for collecting data. If yes, (i.e., following the YES branch of block 610) then it is asked if condition a module(s) exists for condition detection at block 620. If no, (i.e. following the NO branch of block 610) then a new data module(s) is retrieved at block 615. If the data modules exist for collecting data at block 610, then at block 620 it is asked if a condition module(s) exists for condition detection. If yes, (i.e. following the YES branch of block 620) then the modules are combined into monitor at block 630. Then, the monitoring is performed at block 635. If no, (i.e. following the NO branch of block 620), then a new condition module(s) is retrieved at block 625. Then modules are combined into monitor at block 630 and then monitoring is performed at block 635.

CONCLUSION

The above-described methods and computing device describe providing extensible modules and monitors that process data from and determine condition states of data sources. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computing device, comprising:
   a processor;
   a management agent assessed and controlled by the processor, the management agent to receive data having new or different data types from a data source;
   one or more modules accessed by the management agent, to process the received data; and
   the management agent having a first rule to define how the one or more modules are arranged to process the received data, wherein the management agent is to: (i) modify the one or more modules or add a new module to the one or more modules and (ii) modify the first rule or add a new rule to the first rule of the management agent to support a new or different data type received from the data source;
   wherein the one or more modules are defined by each of the following classes:
      a data module class to receive data, format the data as data type specific data, and insert the data into a single data stream;
      a condition module class to receive the single data stream as input, determine whether a pattern, representative of a predefined condition, has occurred, and output a second single data stream; and
      an action module class to receive either the single data stream or the second single data stream as input and perform a particular action; and
   a plurality of monitors, accessed by the management agent, to receive data and determine a condition state of the data source, the plurality of monitors include:
      one or more leaf monitors that receive data and provide a condition state;
      one or more rollup monitors that receives condition state from other monitors and provides a condition state;
      one or more hybrid monitors that receives both data and condition states and provides a condition state; and
      one or more composite monitors composed of two or more of leaf monitors, rollup monitors, and hybrid monitors;
   wherein the classes and modification of the first rule or the new rule allow extensibility to support new data types without significant modification to the management agent or existing workflow; and
   wherein the management agent is configured to receive data from other data sources and local entities, wherein the data sources and local entities are local or not local to the computing device.

2. The computing device of claim 1, wherein the management agent includes the one or more modules.

3. The computing device of claim 1, wherein the first rule is written in an extensible language.

4. The computing device of claim 1, further comprising the management agent having a second rule to define how the modules are grouped as a composite module.

5. The computing device of claim 1, further comprising the management agent having a third rule to define how the one or more monitors determine the condition state of the data source.

6. A method, comprising:
   determining, by a computing device, a scenario performed on data from one or more data sources;
   configuring, by the computing device, a rule that supports the scenario, where the rule defines how modules are grouped to support the scenario; and
   modifying, by the computing device, the modules or adding a new module to the modules and modifying the rule or adding a new rule to the rule to support a new or different data type from the data from the one or more data sources, wherein the modules are defined by each of the following classes:
   a data module class to receive data, format the data as data type specific data, and insert the data into a single data stream;
   a condition module class to receive the single data stream as input, determine whether a pattern, representative of a predefined condition, has occurred, and output a second single data stream; and
   an action module class to receive either the single data stream or the second single data stream as input and perform a particular action; and accessing, by the management agent of the computing device, a plurality of monitors that receive data and determine a condition state of the one or more data sources, the plurality of monitors include:
   one or more leaf monitors that receive data and provide a condition state;
   one or more rollup monitors that receives condition state from other monitors and provides a condition state;
   one or more hybrid monitors that receives both data and condition states and provides a condition state; and
   one or more composite monitors composed of two or more of leaf monitors, rollup monitors, and hybrid monitors;

wherein the classes and modification of the rule or addition of the new rule allow extensibility to support new data types without significant modification to existing workflows.

7. The method of claim 6, wherein the determining further determines the data type of the data.

8. The method of claim 6, wherein the rule supports either monitoring condition state of the one or more data resources or processing data from the one or more data sources.

9. The method of claim 6, further comprising creating modules when modules do not exist to support the scenario.

10. The method of claim 6, further comprising creating rules or monitors when the rules or the monitors do not exist to support the scenario.

11. A computer-readable storage medium having computer-executable components, comprising:
   a management agent that comprises modules that are defined by rules to support a particular scenario directed to one or more data sources,
   wherein the storage medium is to allow a new module to be added to the modules and a new rule to be added to the rules of the management agent to support new or different data types received from the one or more data sources,
   wherein the modules are defined by each of the following classes:
      a data module class to receive data, format the data as data type specific data, and insert the data into a single data stream;
      a condition module class to receive the single data stream as input, determine whether a pattern, representative of a predefined condition, has occurred, and output second single data stream; and
      an action module class to receive either the single data stream or the second single data stream as input and perform a particular action; and
   a plurality of monitors, accessed by the management agent, to receive data and determine a condition state of the one or more data source, the plurality of monitors include:
      one or more leaf monitors that receive data and provide a condition state;
      one or more rollup monitors that receives condition state from other monitors and provides a condition state;
      one or more hybrid monitors that receives both data and condition states and provides a condition state; and
      one or more composite monitors composed of two or more of leaf monitors, rollup monitors, and hybrid monitors;
   wherein the classes and addition of the new rule allow extensibility to support new data types without significant modification to the management agent or existing workflows.

12. The computer-readable storage medium of claim 11, wherein the management agent further comprises monitors that define the modules to support condition state monitoring.

13. The computer-readable storage medium of claim 12, wherein one or more modules are added to the modules to support determined scenarios involving condition state monitoring.

14. The computer-readable storage medium of claim 12, wherein the particular scenario is directed to data processing or condition state monitoring of the one or more data sources.

* * * * *